United States Patent [19]
Brown et al.

[11] Patent Number: 4,810,583
[45] Date of Patent: Mar. 7, 1989

[54] AIRCRAFT WINDSHIELD

[75] Inventors: Theresa S. Brown, Gurley; Connie J. Parvin, New Market; Patricia B. Walters, Harvest; Wolfram F. Rothe, Huntsville; Radford French, Arab, all of Ala.

[73] Assignee: PPG Industries, Inc., Pittsburgh, Pa.

[21] Appl. No.: 39,058

[22] Filed: Apr. 16, 1987

Related U.S. Application Data

[63] Continuation of Ser. No. 811,243, Dec. 19, 1985, abandoned.

[51] Int. Cl.$^4$ .............................................. B32B 17/10
[52] U.S. Cl. .................. 428/425.6; 428/447; 428/34
[58] Field of Search ........................ 428/425.6, 447, 34

[56] References Cited

U.S. PATENT DOCUMENTS

| | | | |
|---|---|---|---|
| 3,255,567 | 6/1966 | Keslar et al. | |
| 3,509,015 | 4/1970 | Wismer et al. | 428/425.6 X |
| 3,657,057 | 4/1972 | Shou et al. | 428/425.6 X |
| 3,703,425 | 11/1972 | Delmonte et al. | 428/425.6 X |
| 4,081,581 | 3/1978 | Littell, Jr. | 428/447 X |
| 4,085,092 | 4/1978 | Chang et al. | |
| 4,121,014 | 10/1978 | Shaffer | |
| 4,231,827 | 11/1980 | Wilson et al. | |
| 4,364,786 | 12/1982 | Smith, Jr. et al. | |
| 4,396,826 | 8/1983 | Orcutt et al. | |
| 4,504,341 | 3/1985 | Radzwill et al. | |
| 4,584,229 | 4/1986 | Bourelier et al. | 428/425.6 X |

FOREIGN PATENT DOCUMENTS

| | | |
|---|---|---|
| 1576394 | 7/1977 | Fed. Rep. of Germany . |
| 0098961 | 1/1983 | Fed. Rep. of Germany . |
| 0117512 | 2/1984 | Fed. Rep. of Germany . |
| 0197806 | 2/1986 | Fed. Rep. of Germany . |

*Primary Examiner*—Nancy A. Swisher
*Attorney, Agent, or Firm*—Andrew C. Siminerio

[57] ABSTRACT

An aircraft windshield having an outer glass ply and an inner antilacerative liner. The liner preferably includes a sheet of polyether urethane and polycaprolactone urethane. The polyether urethane is sandwiched between the glass ply and polycaprolactone urethane and the assembly is laminated to form the windshield.

11 Claims, 1 Drawing Sheet

AIRCRAFT WINDSHIELD

This is a continuation of application Ser. No. 811,243, filed Dec. 19, 1985 now abandoned.

BACKGROUND OF THE INVENTION

1. Field of the Invention

This invention relates to lightweight aircraft transparencies and, in particular, to an antilacerative shield for an impact resistant aircraft windshield.

2. Technical Considerations

Windshields in aircraft applications must be resistant to weathering, scratching and high impact. A glass windshield can provide adequate weathering and scratch resistance, but glass plies may shatter upon impact. In order for a glass sheet to afford sufficient protection against shattering upon high impact, it would require a glass thickness that would be unacceptably heavy and optically inferior to the type of vision panel required for an aircraft windshield. As an alternative, thinner glass plies can be used in combination with lighter weight material plies such as polycarbonates or acrylic resins to provide a windshield that is lightweight, scratch and weather resistant and impact resistant. These glass/plastic composites generally include layers of flexible, compressible material interposed between adjacent glass and plastic layers to help bond the unit together. If the bonding between the glass and plastic is adequate, glass shards resulting from impact will remain adhered to the plastic rather than separate from the unit and inflict injury.

SUMMARY OF THE INVENTION

It is an object of this invention to provide a lightweight impact resistant aircraft transparency with an antilacerative inner shield. The laminated windshield includes an outer glass ply bonded to a water resistant, thermally stable urethane interlayer which, in turn, is bonded to an environmentally stable urethane innerlayer. The double urethane layer forms and antilacerative shield that will hold a shattered outer glass ply thereto and resist puncturing due to sharp glass pieces. The interlayer is preferably polyether urethane and the innerlayer is preferably polycaprolactone urethane.

DETAILED DESCRIPTION OF THE INVENTION

Figure 1:
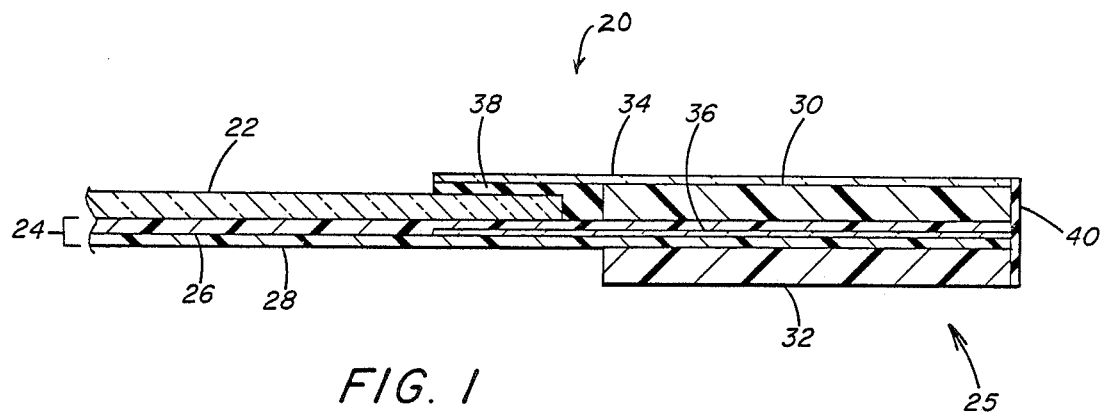
FIG. 1 is a cross-section of a windshield according to the preferred embodiment of the present invention.

The laminated product of the present invention is illustrated in FIG. 1. The laminate 20 includes an outer glass ply 22 and inner antilacerative liner 24 and an edge attachment 25. Although not limiting to this invention, glass ply 22 is preferably tempered either by heat treatment, chemical treatment, or a combination of both. The antilacerative liner 24 includes at least two urethane layers; interlayer 26 and innerlayer 28. The edge attachment 25 preferably includes phenolic blocks 30 and 32, resin impregnated fiberglass straps 34 and 36 and seals 38 and 40 for mounting the laminate 20 on an aircraft frame (not shown).

The interlayer 26 is preferably a urethane that exhibits good moisture resistance, good adhesion to glass, and good low temperature characteristics, i.e., maintains its flexibility at low temperature. This latter property reduces the possibility of the interlayer 26 pulling glass chips from the glass ply 22 due to contraction and brittleness at low temperatures. Although not limited to this invention, the interlayer 24 is preferably polyether urethane. Polyether urethane has poor ultraviolet radiation (UV) resistance so that an additional coating is required. The innerlayer 28 provides greater UV resistance and is environmentally stable, i.e. it will resist oxidation upon exposure to the atmosphere. Although not limiting to this invention, innerlayer 28 is preferably polycaprolactone urethane. The polycaprolactone urethane is stiffer than the polyether urethane interlayer 26 at low temperatures. As a result, if the innerlayer 28 were bonded directly to the glass 24, it would chip the glass 24 at low temperatures due to contraction and brittleness. The innerlayer 28 will remain adhered to the interlayer 26 at the low temperatures to which an aircraft windshield is subjected.

After the components of the laminate 20 are assembled, the unit is laminated in any convenient manner known in the art. Although not limiting to this invention, preferably a pressing plate (not shown) is positioned flush against the exposed surface of innerlayer 28 and held thereagainst in any convenient manner, e.g., taping. The resulting assembly is inserted into a laminating bag of the type disclosed in U.S. Pat. No. 3,255,567 to Keslar et al. which is thereafter evacuated and sealed. The bag containing the assembly is placed in an autoclave where it is exposed to elevated temperatures and pressures to laminate the assembly. The use of pressing plates and/or bags for laminating aircraft transparencies as taught in U.S. Pat. Nos. 4,231,827 to Wilson et al.; 4,396,826 to Orcutt et al.; and 4,504,341 to Radzwil et al., all of which are incorporated by reference, is well known in the aircraft transparency laminating art.

A ball drop test was performed on samples of laminate 20 to examine its impact resistance. The tested samples were 12" by 12" (30.5 cm by 30.5 cm) and included 3/32" (0.24 cm) thick chemically tempered glass 0.025" (0.635 cm) thick polyether urethane interlayer, and 0.025" (0.635 cm) thick polycaprolactone urethane innerlayer. A one pound (2.2 kg) or two pound (4.4 kg) ball was dropped at various heights onto the samples at temperatures between 0° F. (−17.8° C.) and −50° F. (−45.6° C.). A sample was considered to have passed the ball drop test if upon breaking the ball did not penetrate the combined urethane liner 24 and the shattered glass ply 22 adhered to the liner 24. The test results are shown in Table I.

TABLE 1

| Temperature | Sample No. | Ball Weight (LBS) | Drop Height (FT) | Test Result |
|---|---|---|---|---|
| 0° F. | 1 | 1 | 10 | No Break |
|  | 1 | 1 | 20 | Break - passed |
|  | 2 | 1 | 20 | Break - passed |
| −20° F. | 3 | 1 | 20 | No Break |
|  | 3 | 1 | 30 | Break - passed |
|  | 4 | 1 | 30 | Break - passed |
| −30° F. | 5 | 1 | 30 | Break - passed |
|  | 6 | 2 | 20 | Break - passed |
| −40° F. | 7 | 1 | 20 | No Break |
|  | 7 | 1 | 30 | Break - passed |
|  | 8 | 1 | 30 | Break - passed |
| −50° F. | 9 | 1 | 20 | Break - passed |
|  | 10 | 1 | 30 | Break - passed |

As can be seen in Table I the samples passed the test at temperatures of −50° F. with a one pound ball impacting the sample from a height of 30'. These test results are comparable to results attained using other interlayers employed in aircraft transparencies.

The invention shown and described in this disclosure represents and illustrative preferred embodiment thereof. It is understood that various changes may be made without departing from the spirit of the invention as defined in the claimed subject matter which follows.

We claim:

1. A bilayer transparency comprising:
   a glass ply; and
   a multilayer urethane ply including a moisture resistant, thermally stable urethane ply bonded to an environmentally stable urethane ply wherein said moisture resistant ply of said multilayer urethane ply is bonded to said glass ply.
2. The transparency as in claim 1 wherein said moisture resistant ply is polyether urethane.
3. The transparency as in claim 1 wherein said environmentally stable ply is polycaprolactone urethane.
4. The transparency as in claim 1 wherein said moisture resistant ply is polyether urethane and said environmentally stable ply is polycaprolactone urethane.
5. The transparency as in claim 4 wherein said environmentally stable ply is a flexible ply.
6. The transparency as in claim 1 wherein said environmentally stable ply is a flexible ply.
7. A bilayer transparency comprising;
   a rigid glass ply; and
   a multilayer urethane ply including a flexible moisture resistant, thermally stable urethane ply bonded to a flexible, environmentally stable urethane ply wherein said moisture resistant ply of said multilayer urethane ply is bonded to said glass ply.
8. The transparency as in claim 7 wherein said moisture resistant ply is polyether urethane.
9. The transparency as in claim 7 wherein said environmentally stable ply is polycaprolactone urethane.
10. The transparency as in claim 7 wherein said moisture resistant ply is polyether urethane and said environmentally stable ply is polycaprolactone urethane.
11. An impact resistant transparency comprising:
    a rigid glass ply;
    a moisture resistant, thermally stable, flexible urethane interlayer ply bonded to said glass ply; and
    an environmentally stable, flexible innerlayer ply bonded to said urethane interlayer ply.

* * * * *